(12) United States Patent
Saeki et al.

(10) Patent No.: US 8,349,508 B2
(45) Date of Patent: Jan. 8, 2013

(54) FUEL CELL CONTROL UNIT FOR LIMITING POWER OUTPUT

(75) Inventors: Hibiki Saeki, Saitama (JP); Takuya Shirasaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 821 days.

(21) Appl. No.: 12/019,267

(22) Filed: Jan. 24, 2008

(65) Prior Publication Data

US 2008/0182144 A1 Jul. 31, 2008

(30) Foreign Application Priority Data

Jan. 29, 2007 (JP) ................. 2007-017597

(51) Int. Cl.
*H01M 10/46* (2006.01)
*B60W 20/00* (2006.01)
*H02J 7/14* (2006.01)

(52) U.S. Cl. .... 429/430; 429/428; 320/138; 180/65.275

(58) Field of Classification Search ........................ None
See application file for complete search history.

(56) References Cited

U.S. PATENT DOCUMENTS

| | | | |
|---|---|---|---|
| 5,631,532 A * | 5/1997 | Azuma et al. | 320/102 |
| 6,266,576 B1 | 7/2001 | Okada et al. | |
| 2002/0096376 A1 | 7/2002 | Iwasaki | |
| 2004/0013920 A1 * | 1/2004 | Hasuka et al. | 429/23 |
| 2007/0264541 A1 | 11/2007 | Yanase et al. | |

FOREIGN PATENT DOCUMENTS

| | | |
|---|---|---|
| JP | 05-182675 A | 7/1993 |
| JP | 09-086227 B2 | 3/1997 |
| JP | 2002-218606 A | 8/2002 |
| JP | 2005-005009 A | 1/2005 |
| WO | WO 2006/077768 A1 | 7/2006 |

* cited by examiner

*Primary Examiner* — Keith Walker
(74) *Attorney, Agent, or Firm* — Arent Fox LLP (57) ABSTRACT

When the output of a fuel cell starts to decrease, in consideration of the increase in the power generation efficiency, an instruction for the output of the fuel cell undergoes a smoothing process to gradually decrease the output, and excessive electric power generated during a period in which the power generation efficiency is high is used for charging a battery. While the output of the fuel cell is increasing, the power generation efficiency of the fuel cell is low. Thus, assisting electrical energy from the battery is increased. In this manner, the power generation output when the power generation efficiency of the fuel cell is low is reduced from a high power generation output to a low power generation output to achieve improvement in the average power generation efficiency.

2 Claims, 5 Drawing Sheets

FUEL CELL CONTROL UNIT FOR LIMITING POWER OUTPUT

BACKGROUND OF THE INVENTION

1. Field of the Invention

The present invention relates to a fuel cell system for controlling the efficiency of a fuel cell.

2. Description of the Related Art

For example, a polymer electrolyte fuel cell employs a membrane electrode assembly which includes an anode (fuel electrode) and a cathode (air electrode), and a polymer electrolyte membrane interposed between the electrodes. The electrolyte membrane is a polymer ion exchange membrane. The membrane electrode assembly is sandwiched between a pair of separators. A fuel gas flow field is formed between the anode and one of the separators, and an oxygen-containing gas flow field is formed between the cathode and the other of the separators. In use, normally, a predetermined numbers of the membrane electrode assemblies and separators are stacked together to form a fuel cell stack.

In the fuel cell, a fuel gas such as a hydrogen-containing gas is supplied to the fuel gas flow field. The fuel gas flows through the fuel gas flow field along the anode. The catalyst of the anode induces a chemical reaction of the fuel gas to split the hydrogen molecule into hydrogen ions and electrons. The hydrogen ions move toward the cathode through the suitably humidified electrolyte membrane, and the electrons flow through an external circuit to the cathode, creating DC electrical energy. Further, in the fuel cell, an oxygen-containing gas such as the air is supplied to the oxygen-containing gas flow field, and the oxygen-containing gas flows along the cathode for reaction. At the cathode, hydrogen ions from the anode combine with the electrons and oxygen to produce water. The produced water moves through the electrolyte membrane, and the water is also kept at the anode.

In the fuel cell system, it is preferable that the fuel cell is used in the state with high power generation efficiency. In order to increase the power generation efficiency of the fuel cell, a fuel cell system in which the load is driven by a fuel cell and an energy storage is proposed (see Japanese Laid-Open Patent Publication No. 5-182675).

In the technique disclosed in Japanese Laid-Open Patent Publication No. 5-182675, the fuel cell is operated intermittently only using a rated output having high power generation efficiency. During operation using the rated output, when the load is smaller than the rated output, the energy storage is charged by the excessive electric power. When operation of the fuel cell is stopped, electric power is supplied (discharged) from the energy storage to the load.

However, in the conventional technique, no consideration is given for the change of efficiency at the time when the power generation output is increasing, and at the time when the power generation output is decreasing.

Figure 4A:
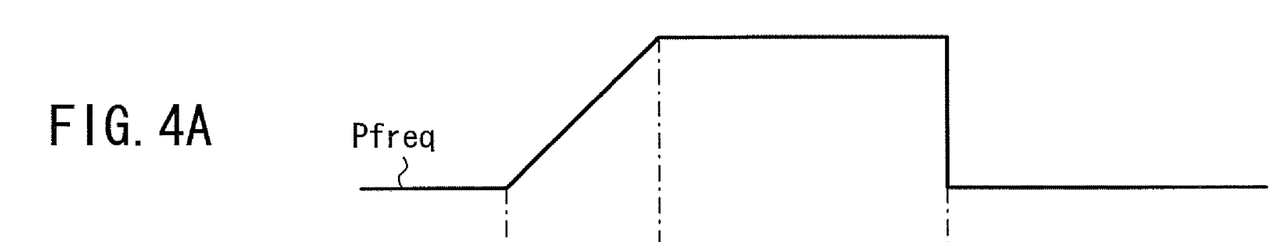
FIG. 4A is a graph showing the required load.
Figure 4B:
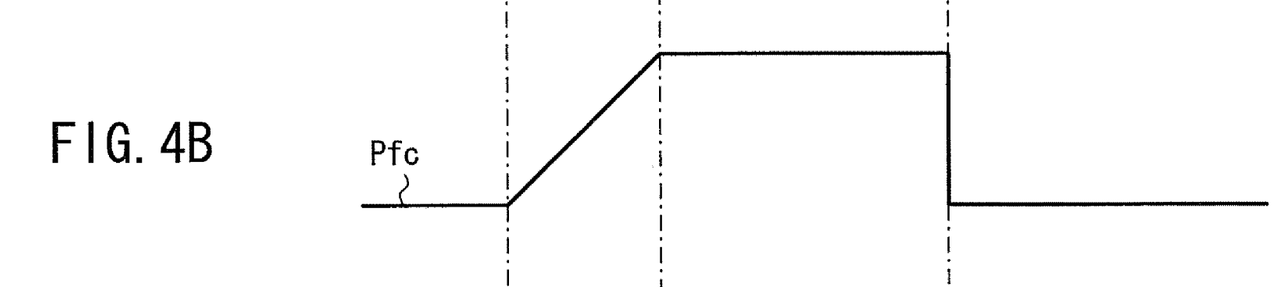
FIG. 4B is a graph showing the power generation output.
Figure 4C:
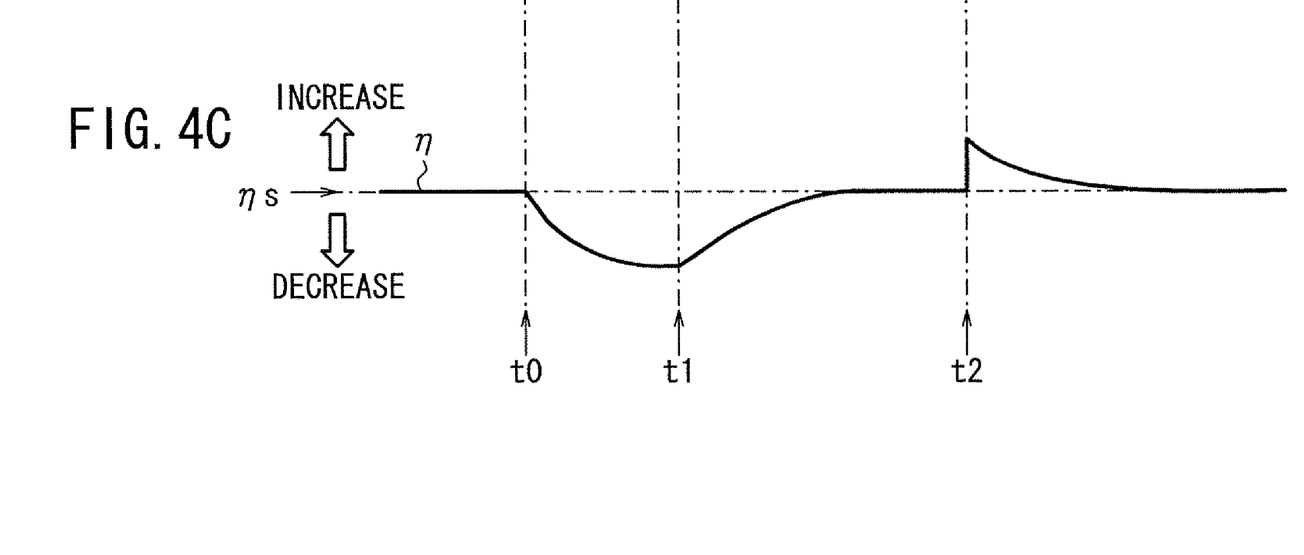
FIG. 4C is a graph showing the power generation efficiency.

The inventors of the present application found the cause-effect relationship about the power generation efficiency shown in FIG. 4C.

In FIGS. 4A, 4B, and 4C, for example, in a vehicle equipped with a fuel cell system as a driving source, during acceleration operation, as shown in a period from time t0 to t1, the required output (also referred to as the required electric power, the essential load, or the required load) Preq (FIG. 4A) increases continuously. As a result, the power generation output (output herein means electric power) Pfc (FIG. 4B) increases continuously. When deceleration operation is started at time t2, the required output Preq decreases instantly. As a result, the power generation output Pfc of the fuel cell decreases instantly.

In this case, as shown in FIG. 4C, during acceleration operation (time t0 to time t1), initially, the efficiency of the fuel cell (power generation efficiency) η decreases continuously from the efficiency ηs in the steady state. After time t1, the efficiency increases gradually up to the efficiency ηs in the steady state. Further, when deceleration operation is started at time t2, the efficiency η increases instantly from the efficiency ηs in the steady state. After time t2, the efficiency decreases gradually up to the efficiency ηs in the steady state.

Next, the change of efficiency η in FIG. 4C will be studied. In the polymer electrolyte fuel cell, the reaction does not occur actively in the low load state (state until time t0 in FIG. 4A where the required electric power Preq is small), and the electrolyte membrane tends to be dried. Thus, the proton conductivity in the electrolyte membrane becomes small. From this state, when the load is increased, the efficiency decreases below the efficiency ηs in the steady state (as can be seen from FIG. 4C, from time t0, the efficiency η decreases). After time t0, the fuel cell is placed in a high load state with the increased load (the required electric power Preq becomes large at time t1. After elapse of a certain period of time, reaction is induced actively, and the amount of water produced in the reaction is increased. If the high load state continues, further reaction is induced, and the operation state is improved. The proton conductivity becomes high, and the efficiency η is restored (time little bit before time t1 to time t2). When the efficiency η is restored to the efficiency ηs in the steady state, and the required load Rreq decreases sharply (time t2), if the power generation output Pfc is reduced sharply in correspondence with the change in the required load Rreq, though the fuel cell is in a suitable operating state (with high efficiency), since the power generation amount is reduced, the efficiency η is lowered again without effectively utilizing the suitable power generation state (after time t2).

Figure 5:
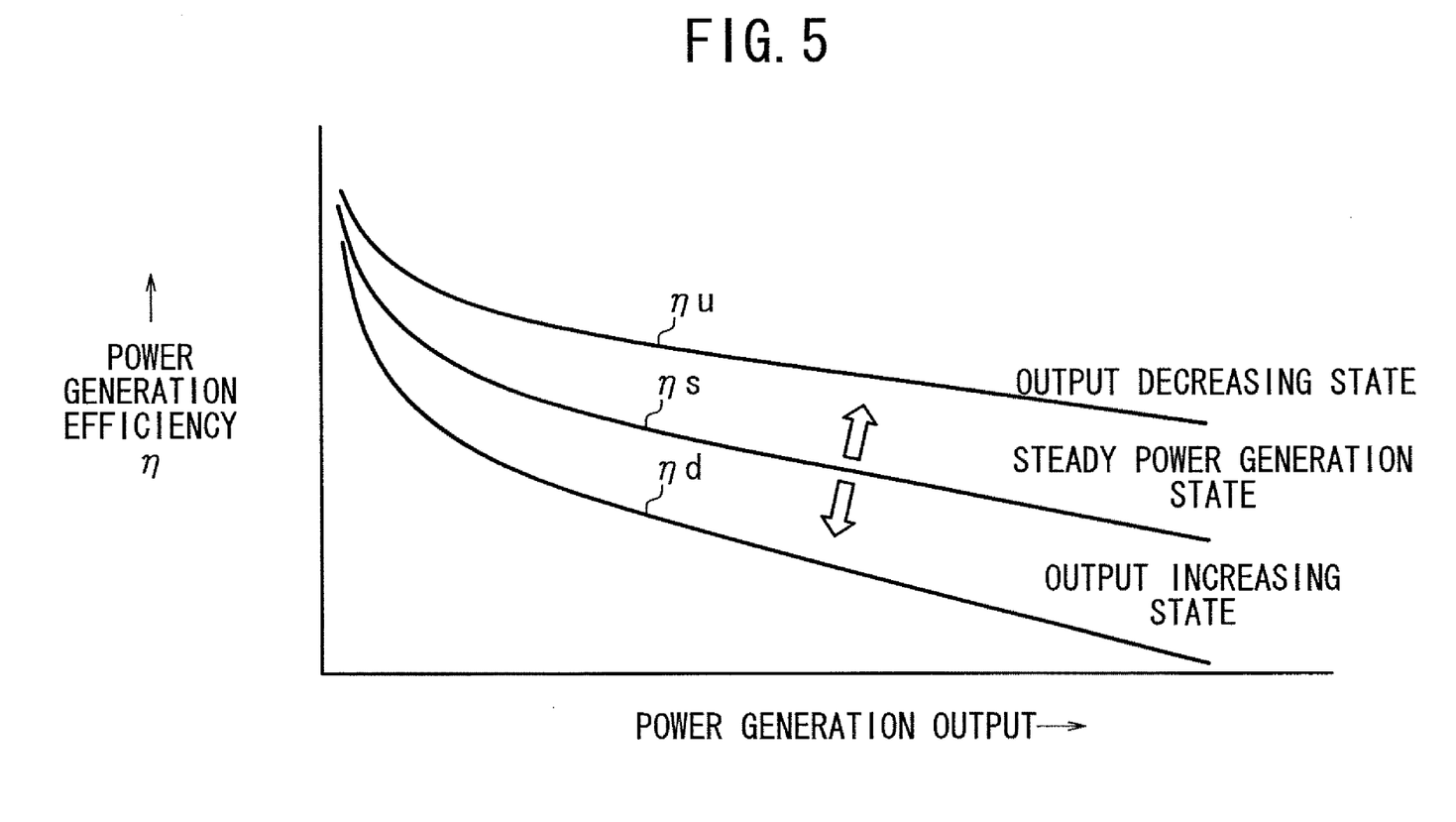
FIG. 5 is a graph showing the relationships between the power generation output and the power generation efficiency while the output is decreasing, increasing and in a steady power generation state.

FIG. 5 is a graph showing the change in the power generation efficiency η relative to the power generation output. As can be seen from FIG. 5, when the output is decreasing, the fuel cell has high power generation efficiency ηu in comparison with the power generation efficiency ηs in the steady state. When the output is increasing, the fuel cell has a power generation efficiency ηd in comparison with the power generation efficiency ηs in the steady state.

SUMMARY OF THE INVENTION

The present invention has been made based on the above findings, and an object of the present invention is to provide a fuel cell system which makes it possible to increase the power generation efficiency of a fuel cell.

A fuel cell system according to the present invention includes a fuel cell operated for power generation by reaction of reactant gases supplied to the fuel cell, and an output control device for controlling the supply of the reactant gases and electrical current collected from the fuel cell. The fuel cell system has the following features.

The output control device includes means for calculating a target output of the fuel cell in correspondence with an output required for a load, means for determining whether the required output is increased or decreased, and means for limiting an output decreasing speed by gradually decreasing the target output when the determining means determines that the required output is decreased.

According to the invention having this feature, while the required output is decreasing, the target output of the fuel cell is decreased gradually to effectively utilize the high efficiency state of the fuel cell. Thus, it is possible to increase the average power generation efficiently.

In the invention having the above feature, the fuel cell system may further comprise an energy storage provided in parallel with the load, and the energy storage is charged by an excessive output when the target output is decreased gradually. Further, the output control device may further comprise means for relaxing or releasing a limit of the output decreasing speed when there is a possibility that the excessive output may exceed an allowable limit of electric power for continuously charging the energy storage.

According to the invention having this feature, it is possible to prevent the damage of the energy storage. Further, by charging the energy storage with the continuous charging electric power allowable limit, when the target output is increased the next time, further increase in the assisting electrical energy by the energy storage is achieved, and further improvement in the average efficiency is achieved.

In the system including a converter provided between the energy storage and the fuel cell, it is sufficient that the charging current is limited so as not to exceed the smaller of the continuous current allowable limit of the converter or the continuous current allowable limit of the energy storage.

For example, a polymer electrolyte fuel cell is used as the fuel cell. However, the present invention is not limited in this respect. For example, the present invention is applicable to other types of fuel cells in which the power generation efficiency becomes high when the output is decreasing and the power generation performance becomes low when the output is increasing.

In the invention having the above feature, the load may include an electric motor, and the output control device may further include limit adjustment means for preferentially charging the energy storage using regenerative electric power by the electric motor when decrease in the required output is caused by deceleration, and adopting the limit of the output decreasing speed by the output decreasing speed limit relaxing means in preference to a limit of the regenerative electric power, when there is a possibility that the total of the excessive output and the regenerative electric power may exceed the allowable limit of electric power for continuously charging said energy storage.

In the invention having this feature, in the case where electric power generated by power generation of the fuel cell and regenerative electric power are supplied to the energy storage, if the total output exceeds the maximum output of the energy storage, firstly, electric power by power generation of the fuel cell is limited preferentially, and regenerative electric power is stored (collected) in the energy storage, and then, the regenerative electric power is limited. Thus, further improvement in the average power generation efficiency is achieved. In this case, since the limit adjustment means is provided, it is possible to prevent the energy storage from being damaged due to excessive charging electrical current.

In the present invention, while the required output of the fuel cell is decreasing, by gradually decreasing the target output of the fuel cell, the high efficiency state of the fuel cell during the decrease in the output is effectively utilized, and the efficiency is improved as a whole.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, embodiments of the present invention will be described with reference to the drawings.

Figure 1:
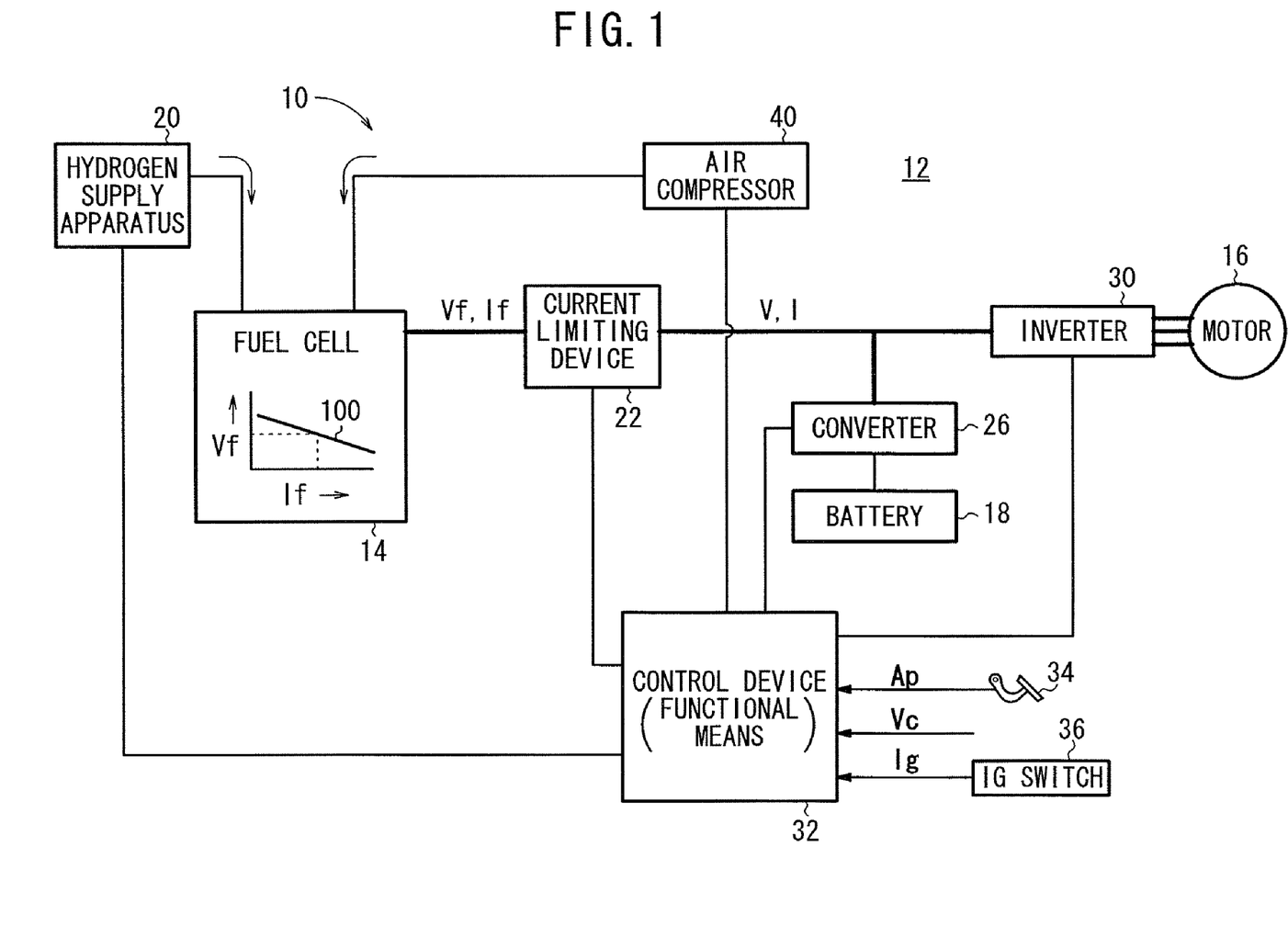
FIG. 1 is a diagram schematically showing structure of a fuel cell vehicle equipped with a fuel cell system according to an embodiment of the present invention.

FIG. 1 is a diagram schematically showing structure of a fuel cell vehicle 12 including a fuel cell system 10 according to an embodiment of the present invention.

Basically, the fuel cell vehicle 12 includes a fuel cell 14, a travel motor (electric motor) 16, and a battery 18 as an energy storage charged by electric power generated by the fuel cell 14 and regenerative electric power supplied from the motor 16. The battery 18 also assists the output of the fuel cell 14. For example, the battery 18 is a lithium ion battery. Instead of the battery 18, a capacitor may be used as the energy storage.

The fuel cell 14 has stack structure formed by stacking a plurality of cells each including an anode, and a cathode, and a solid polymer electrolyte membrane interposed between the anode and the cathode.

A hydrogen supply apparatus 20 including a high pressure hydrogen tank is connected to the anode of the fuel cell 14, and as a reactant gas, a fuel gas (hydrogen) is supplied from the hydrogen supply apparatus 20 to the anode. Further, an air compressor 40 is connected to the cathode of the fuel cell 14, and as another reactant gas, the air (oxygen) is supplied from the air compressor 40 to the cathode.

When the hydrogen is supplied to a reaction surface of the anode, the hydrogen is ionized, and moves to the cathode through the solid polymer electrolyte membrane. Electrons produced in the reaction are collected as electrical current, and utilized as DC electrical energy.

The fuel cell 14 is connected to an input of a current limiting device 22 for detecting the power generation voltage Vf and the power generation current If of the fuel cell 14.

The current limiting device 22 has an output connected to a converter 26 operated bi-directionally for detecting the voltage between the terminals of the battery 18 and detecting electrical current supplied/discharged to/from the battery 18, an inverter 30 for converting the DC voltage V and current I on a power line denoted by a solid bold line into the alternating voltage and current, and auxiliary devices (not shown) such as a light, and an air conditioner.

The battery 18 is connected to the converter 26, and the motor 16 for driving the fuel cell vehicle 12 is connected to the inverter 30. For the converter 26 and the battery 18, rated limit values indicating critical or allowable limits of electrical current supplied continuously to the converter 26 and the battery 18 are specified. The critical or allowable limit of electrical current supplied continuously to the converter 26 or the battery 18 is referred to as the continuous current allowable (critical) limit. For the battery 18, it is also referred to as the continuous charging electric power allowable (critical) limit.

The motor 16 rotates for the travel of the fuel cell vehicle 12, utilizing electric power from the fuel cell 14, and as necessary, auxiliary electric power from the battery 18, for assisting the output of the fuel cell 14.

Further, when the fuel cell vehicle 12 is decelerated during travel by releasing an accelerator pedal 34 and depressing a brake pedal, the motor 16 generates regenerative electric power, and the regenerative electric power is used for charging the battery 18 through the inverter 30 and the converter 26.

A control device (output control device) 32 is connected to components such as the fuel cell 14, the current limiting device 22, the hydrogen supply apparatus 20, the air compressor 40, the converter 26, and the inverter 30.

The control device 32 calculates the required output (also referred to as the required electric power, essential load, or required load) based on the depressed position Ap of the accelerator pedal 34 or the vehicle speed Vc, and calculates a target output (V, I) corresponding to the required output. Based on the calculated target output, the control device 32 outputs control signals as instructions to the hydrogen supply apparatus 20, the current limiting device 22, the inverter 30, the motor 16, the air compressor 40, the converter 26, or the like. As described later, in calculating the target output, charging/discharging output (charging/discharging electric power) to/from the battery 18 and regenerative output (regenerative electric power) supplied from the motor 16 are taken into account. Further, the control device 32 starts, or stops operation of the fuel cell system 10 based on ignition signals (ON and OFF signals) Ig from an ignition switch 36.

The control device 32 controls the entire operation of the fuel cell system 10 and the fuel cell vehicle 12. The control device 32 comprises a computer, and operates also as means for achieving various functions by executing programs stored in a memory based on various inputs (function achieving means). In the present embodiment, for example, the control device 32 is operated as means for calculating a target output (target output calculation means), means for determining decrease/increase in the output (output increase/decrease determination means), means for limiting the decreasing speed in the output (output decreasing speed limiting means), means for relaxing the decreasing speed limit in the output (output decreasing speed limit relaxing means), and means for adjusting the limit (limit adjusting means).

At least one of the current limiting device 22 and the converter 26 is configured to control the current If (since If is nearly equal to I, in the embodiment, it is assumed that If=I) collected from the fuel cell 14 in accordance with the target output instruction from the control device 32. That is, in the system shown in FIG. 1, for controlling the current If collected from the fuel cell 14, it is sufficient that either of the current limiting device (current control device) 22 or the converter 26 is only provided.

For example, assuming that the current limiting device 22 is not provided, and only the converter 26 is provided, stated otherwise, assuming that the output of the fuel cell 14 is directly coupled to the converter 26 (Vf=V), since the fuel cell 14 has a predetermined characteristic 100 shown in FIG. 1 in which the output voltage Vf is proportional, with negative gradient, to the increase/decrease in the collected current If (as the linear increase in the current If, the output voltage Vf decreases linearly, and as the linear decrease in the current If, the output voltage Vf increases linearly), when the collected current If=I, the converter 26 implements feedback control for controlling the voltage V appearing in the power line to match the corresponding voltage Vf on the characteristic 100.

In contrast, in the case where the converter 26 is not provided, or in the case where the converter 26 without having the function of setting or controlling the voltage V is provided, the current limiting device 22 is configured to control the power generation output Vf of the fuel cell 14 referring to the characteristic 100, to achieve the target output (V, I).

In the fuel cell system 10 of the present embodiment, the current limiting device 22 sets, and controls the target output (V, I) and the converter 26 controls the voltage/current supplied/discharged to/from the battery 18.

The fuel cell vehicle 12 equipped with the fuel cell system 10 according to the present embodiment is basically operated as described above.

Figure 2:
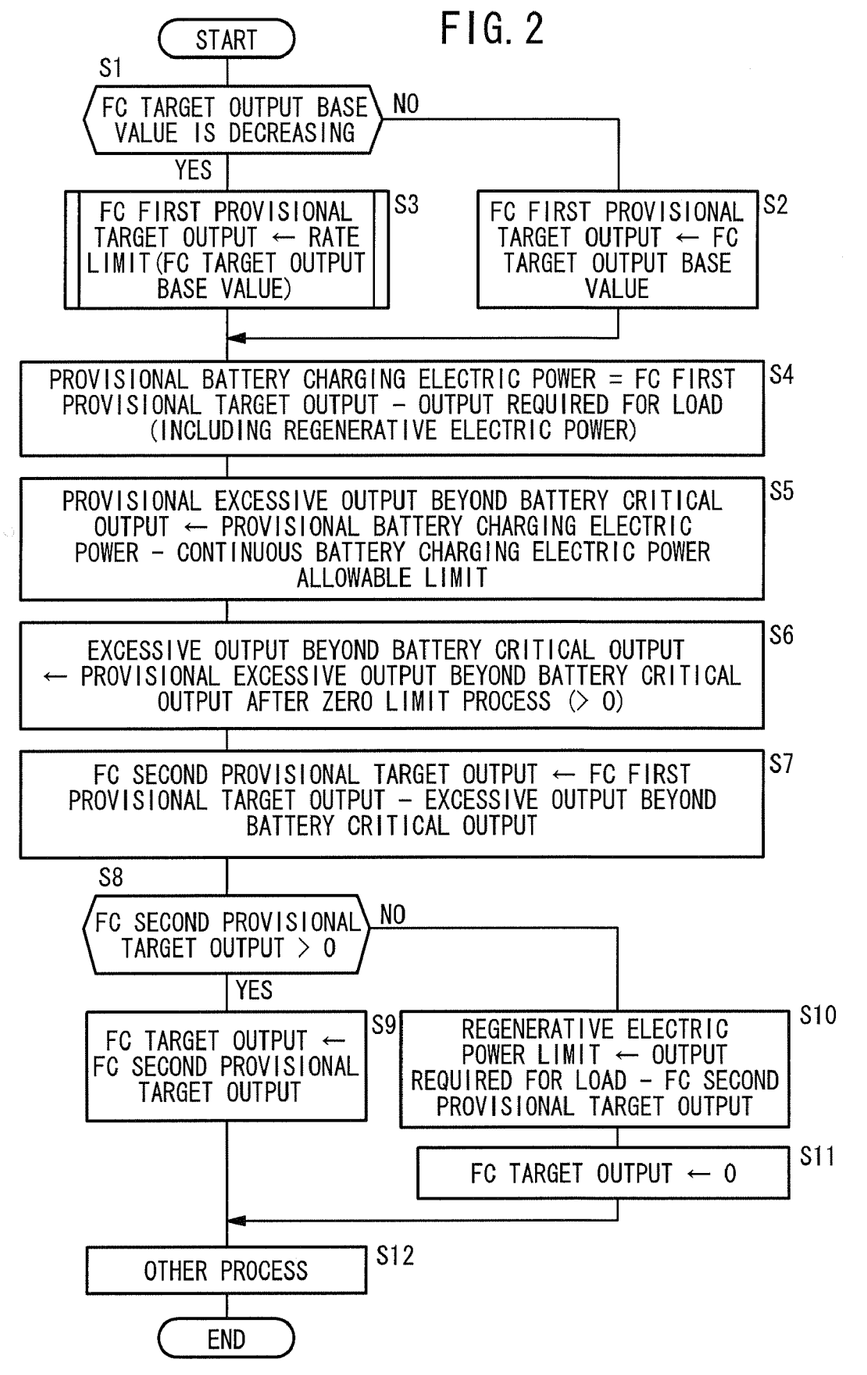
FIG. 2 is a flow chart showing a manner of calculating the output of a fuel cell of the fuel cell vehicle shown in FIG. 1.

Next, operation of setting the target output of the fuel cell (FC) 14 (hereinafter also referred to as the "FC target output") of the fuel cell vehicle 12 equipped with the fuel cell system 10 according to the present embodiment will be described with reference to a flow chart in FIG. 2 and time charts in FIGS. 3A and 3B.

Figure 3A:
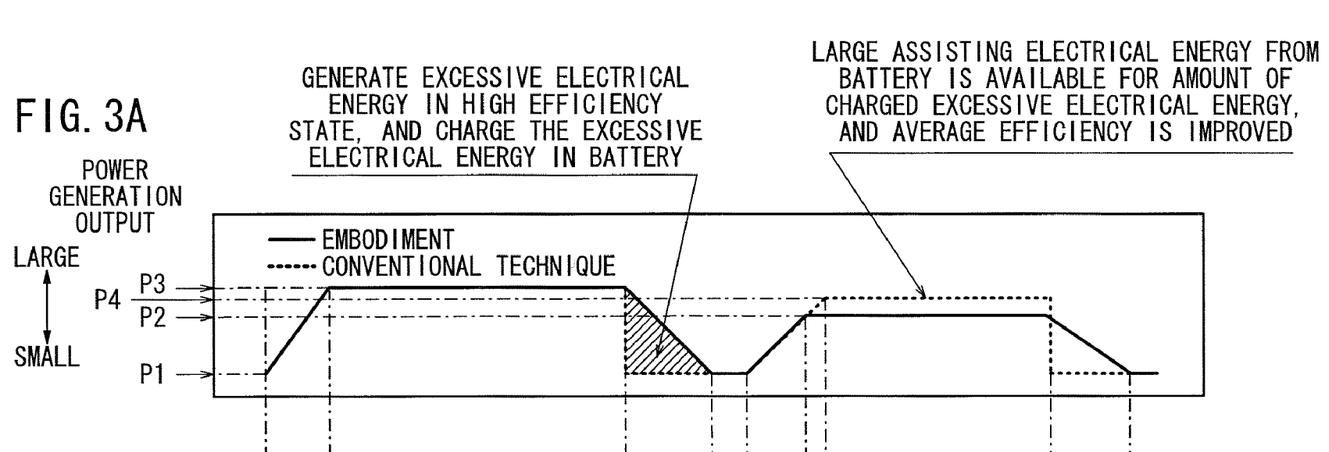
FIG. 3A is a time chart used for explanation of comparison between the power generation output in the embodiment and the power generation output in a conventional technique.
Figure 3B:
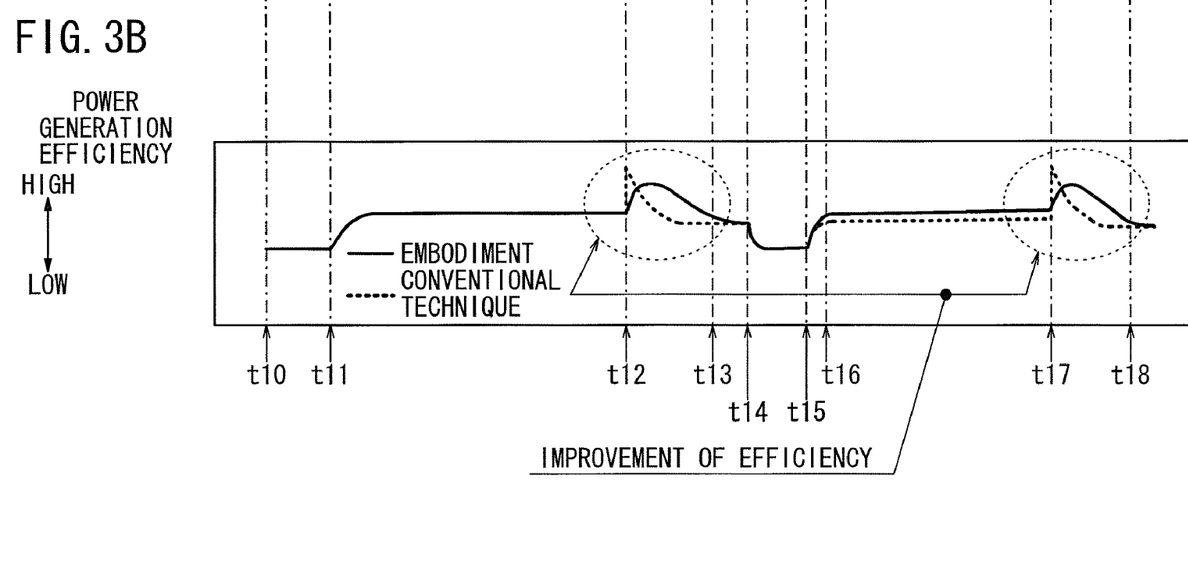
FIG. 3B is a flow chart used for explanation of comparison between the power generation efficiency in the embodiment and the power generation efficiency in the conventional technique.

In FIGS. 3A and 3B, solid lines represent control by the technique according to the present embodiment, and dotted lines represent control by a conventional technique. In FIG. 3A, the vertical axis denotes the power generation output (electric power generated in power generation), and in FIG. 3B, the vertical axis denotes the power generation efficiency.

Firstly, in step S1 (the step of detecting instant decrease in a load of the fuel cell 14), it is determined whether an FC target output base value is decreasing or not. The FC target output base value herein means a basic value for calculating the FC target output to be determined. For example, at time t12 and time t17, when it is detected that the accelerator pedal 34 is released for deceleration, the FC target output base value changes from FC target output P3 or FC target output P2 to FC target output P1. Therefore, in this case, it is determined that the FC target output base value is decreasing. Further, for example, at time t10 and time t14, when the accelerator pedal 34 is depressed for acceleration, the FC target output base value changes from the FC target output P1 to the FC target output P3 or FC target output P4. Therefore, in this case, it is determined that the FC target output base value is increasing. Further, for example, at time t11 to time t12, and at time t15 to t17, the FC target output base values do not change at the FC target output P3, and the FC target output P2, respectively. In the embodiment, the FC target output base values have the relationship of: P1<P2<P4<P3.

Hereinafter, for the sake of brevity, operation during time t10 to time t14 will be described mainly.

As can be seen from a period from time t10 to time t11, in the case where the target output base value is increasing, or a period from time t11 to time t12, in the case where the target output base value is constant, and does not change, determination in step S1 is negative (NO). In the case, in step S2, the FC target output base value is used as FC first provisional target output (first provisional output of the FC target output, before second provisional output of the FC target output is determined) (FC first provisional target output FC target output base value).

In step S1, at time t12, if it is determined that the FC target output base value is decreasing, in step S3 (step of gradually decreasing the output of the fuel cell 14 by the control device 32, when instant decrease in the load is detected), the rate of the output decreasing speed is limited as the FC first provisional target output until the FC target output base value P1 is achieved. That is, as shown by a period from time t12 to time t13 in FIG. 3A, the power generation output is gradually decreased from the power generation output P3 to the power generation output P1. Instead of decreasing the power generation output linearly in this manner, the power generation output may be decreased with a first order time lag (each of these processes is referred to as a smoothing process). That is, instead of instantly decreasing the power generation output P3 to the power generation output P1, by limiting the instantaneous change in the output, the power generation output may be decreased gradually under control in the rate limiting process from the power generation output P3 to the power generation output P1 (FC first provisional target output←rate limit).

When the FC target output base value is decreasing, as shown in FIG. 5, since the power generation efficiency $\eta$ is high (high efficiency $\eta u$), as shown by a hatched area in FIG. 3A, instead of instantly limiting the supply of hydrogen and the air at time t12 as in the case of the conventional technique, by gradually decreasing the power generation output in the rate limiting process, electrical energy is excessively generated in the high efficiency state. The excessive electrical energy is used for charging the battery 18 as described later. As can be seen from a period from time t15 to time t17, in correspondence with the excessive electrical energy which is used for charging the battery 18, large electrical energy supplied from the battery 18 becomes available for assisting operation of the motor 16. For example, when the required output is calculated as P4, by the output of the battery 18, electrical energy for the amount calculated by P4−P2 is available for assisting operation of the motor 16. In the segment (the period from time t15 to time t17), the power generation output is increased at the FC target output (power generation output) P2. By the assisting electrical energy, the amount of hydrogen consumption is reduced, the power generation efficiency is improved, and the fuel economy is improved.

Then, in step S4, provisional battery charging electric power which can be supplied to the battery 18 is calculated. In this case, by subtracting the required output of the motor 16 as the load (electric power required for the load) from the FC first provisional target output calculated in step S2 or step S3, the battery provisional charging electric power is calculated (provisional battery charging electric power=FC first provisional target output—output required for the load). In this case, in the period from time t12 to time t13, if regenerative output (regenerative electric power) is regenerated through the inverter 30, the regenerative output is taken into consideration. Thus, the output required for the load has a negative value.

Then, in step S5, the continuous charging electric power allowable limit (battery critical output) indicating the critical output allowable for the battery 18 is subtracted from the battery provisional charging electric power calculated in step S4, and the excessive electric power is used as the provisional excessive output beyond the battery critical output (provisional excessive output beyond the battery critical output←provisional battery charging electric power—continuous battery charging electric power allowable limit). In practice, in considering the provisional excessive output beyond the battery critical output of the battery 18, it is also examined whether the continuous current allowable limit of the converter 26 (allowable limit value which can be continuously supplied to the converter 26) is exceeded or not, and based on the smaller value of the continuous current allowable limit of the converter 26 and the continuous battery charging electric power allowable limit, the following control is implemented.

In calculation of step S5, if the provisional excessive output beyond the battery critical output has a positive value, i.e., if the charging electric power is the continuous charging electric power allowable limit of the battery 18 or greater, in step S6, during the period, a process of limiting the provisional excessive output beyond the battery critical output of the battery 18 to zero is carried out. The provisional excessive output beyond the battery critical output is used as the excessive output beyond the battery critical output. By the process in step S6, large charging electric power is supplied to the battery 18 as much as possible, as long as the continuous charging electric power allowable limit is not exceeded.

Then, in step S7, FC second provisional target output is calculated by subtracting the excessive output beyond the battery critical output from the FC first provisional target output determined in step S2 or step S3 (FC second provisional target output←FC first provisional target output—excessive output beyond the battery critical output). In this case, normally, the excessive output beyond the battery critical output has a negative value, and the maximum value is limited to zero.

In step S8, it is determined whether or not the FC second provisional target output determined in this manner is greater than zero. That is, it is considered whether or not power generation by the fuel cell 14 is required.

If determination in step S8 is affirmative (YES), it is determined that power generation by the fuel cell 14 is required. In step S9, the FC provisional target output is used as the FC target output (FC target output←FC second provisional target output).

If determination in step S8 is negative (NO), it is determined that the regenerative output is larger than the output required for the load. Therefore, in step S10, a value calculated by subtracting the FC second provisional target output from the output required for the load (required output) is used as the limiting value for limiting the regenerative electric power. In step S11, in order to prohibit power generation of the fuel cell 14, the FC target output is set to zero (FC target output←0). It should be noted that the excessive regenerative electric power (the excessive electric power which is not consumed by the battery 18 and the auxiliary device) is discharged through a discharge resistor or the like.

Then, in "other process" of step S12, the current limiting device 22 is controlled to achieve the FC target output determined in step S9. In correspondence with the control, the hydrogen supply apparatus 20 and the air compressor 40 are controlled. Otherwise, if the FC target output is determined as zero in step S11, the current limiting device 22 is controlled to interrupt the output. In correspondence with the control, the supply of hydrogen by the hydrogen supply apparatus 20 to the fuel cell 14 is stopped, and the supply of the air by the air compressor 40 to the fuel cell 14 is stopped.

Operation and advantages of the foregoing embodiment will be described below briefly in connection with acceleration/deceleration operation of the fuel cell vehicle 12. At the time of deceleration, when the output of the fuel cell 14 is decreasing (time t12), improvement in the power generation efficiency $\eta$ is considered (see FIG. 5). A fuel cell output instruction (to the current limiting device 22) is subjected to the smoothing process for gradually decreasing the output, and the battery is charged by the excessive electrical energy generated during a period in which power generation efficiency is high (time t12 to time t13). Further, e.g., at the time of acceleration (time t14 to time t17, when the output is increased the next time, the power generation efficiency η is decreased. The current limiting device 22 is controlled to increase the assisting energy (P4−P2) by the battery 18. Thus, the power generation output when the power generation efficiency η is low at the time of increasing the output of the fuel cell 14 (see FIG. 5) is reduced from the power generation output P4 to the power generation output P2. As a result, it is possible to improve the average power generation efficiency. That is, as can be seen from FIG. 3A and FIG. 3B, in the conventional technique, at time t12, for example, at the time of deceleration, when the power generation output is decreased sharply, due to the rapid (instant) decrease in the power generation output, the high efficiency state of the fuel cell 14 during a period in which the output is decreasing is not utilized effectively. In contrast, in the present embodiment, the period in which the output is decreasing can be utilized positively. Thus, improvement in the average power generation efficiency is achieved.

Structure, operation and advantages of the foregoing embodiment will be described further in detail. The fuel cell system 10 includes a fuel cell 14 operated for power generation by reaction of reactant gases supplied to the fuel cell, and the control device as the output control device for controlling the supply of the reactant gases and electrical current collected from the fuel cell 14. The control device 32 includes means (step S9 or step S11) for calculating an FC target output of the fuel cell 14 in correspondence with an output required for a load (motor 16 and the auxiliary device), means (step S1) for determining whether the required output is increased or decreased, and means (step S3) for limiting an output decreasing speed by gradually decreasing the target output when the determining means determines that the required output is decreased.

As described above, when the required output is decreasing, (step S1: YES), as can be seen from the period from time t12 to time t13, or the period from time t17 to time t18, the target output (power generation output) of the fuel cell 14 is decreased gradually to effectively utilize the high efficiency state of the fuel cell 14 in the period in which the output is decreasing as shown in FIG. 5 (also see improvement of efficiency shown in a frame surrounded by the dotted line in FIG. 3B). Thus, it is possible to increase the average power generation efficiency (time t12 to time t13, and time t17 to time t18).

In this case, the battery 18 charged by the excessive output when the target output is decreased gradually and the load (motor 16 and the auxiliary device) are provided in parallel. If it is presumed that the excessive output may exceed the continuous charging electric power allowable limit (step S5), means (step S6) for relaxing a limit of the decreasing speed of the output for relaxing or releasing the limit of the output decreasing speed is provided. That is, the deceleration slope of the power generation output shown by the period from time t12 to time t13 in FIG. 3A is sharply or vertically controlled. Stated otherwise, the smoothing process is relaxed or released.

By implementing the control in this manner, it is possible to prevent the damage of the battery 18 or prevent the damage of the converter 26. Further, by charging the battery 18 with the continuous charging electric power allowable limit, when the target output is increased the next time, further increase in the assisting energy by the battery 18 is achieved, and further improvement in the average efficiency is achieved.

Since the converter 26 is provided between the battery 18 and the fuel cell 14, preferably, the charging current is limited so as not to exceed the smaller of the continuous current allowable limit of the converter 26 or the continuous current allowable limit of the battery 18.

Further, in the case where the motor 16 is part of the load, and decrease in the required output is caused by deceleration of the motor 16, the regenerative electric power supplied from the motor 16 through the inverter 30 is used for charging the battery 18 in preference to the electric power generated in power generation.

For example, in the case where it is presumed that the total of electric power from the excessive output of the fuel cell 14 and the regenerative electric power from the motor 16 may exceed the continuous charging electric power allowable limit of the battery 18, means (step S10) for adopting the limit of the output decreasing speed by the limit relaxing means (step S6) in preference to the limit of the regenerative electric power is provided. Thus, the regenerative electric power is collected in preference to the excessive electric power of the fuel cell 14 for the battery 18. In the system, further improvement in the average power generation efficiency is achieved.

The present invention is not limited to the above described embodiment. It is a matter of course that various modifications may be made within the scope of the description and the drawings.

What is claimed is:

1. A fuel cell system comprising:
a fuel cell operated for power generation by reaction of reactant gases supplied to said fuel cell and an output control device for control unit the supply of the reactant gases and power generation output of said fuel cell, said output control device comprising:
means for calculating a target output base value of said fuel cell, wherein the calculation is performed in correspondence with deceleration or acceleration by operation of an accelerator pedal for driving a motor;
means for determining whether the target output base value is increased or decreased; and
means for limiting a decreasing speed of the power generation output, wherein the limitation is performed by putting a limit on a rate of the decreasing speed of the power generation output when the target output base value is decreased, such that the power generation decrease occurs linearly or with a first order lag, with respect to time; and
further comprising an energy storage provided in parallel with said motor, said energy storage being charged by an excessive output when the power generation output is decreased, the excessive output being a difference between the target output base value and the power generation output, and
said output control device further comprising means for relaxing or releasing the limit of the decreasing speed of the power generation output, wherein the relaxation or release of the limit is performed when the excessive output exceeds an allowable limit of electric power for continuously charging said energy storage.

2. A fuel cell system comprising:
a fuel cell operated for power generation by reaction of reactant gases supplied to said fuel cell and an output control device for control unit the supply of the reactant gases and power generation output of said fuel cell, said output control device comprising:
means for calculating a target output base value of said fuel cell, wherein the calculation is performed in correspondence with deceleration or acceleration by operation of an accelerator pedal for driving a motor;
means for determining whether the target output base value is increased or decreased; and means for limiting a decreasing speed of the power generation output, wherein the limitation is performed by putting a limit on a rate of the decreasing speed of the power generation output when the target output base value is decreased, such that the power generation decrease occurs linearly or with a first order lag, with respect to time;

wherein said output control device further comprises means for adjusting the limit, wherein charging said energy storage when a decrease in the power generation output is caused by deceleration, the limit adjusting means gives preference to regenerative electric power by said motor over the excessive output charging said energy storage, and wherein the limit adjusting means relaxes or releases the limit of the decreasing speed of the power generation output before limiting the regenerative electric power, when the total of the excessive output and the regenerative electric power exceeds the allowable limit of electric power for continuously charging said energy storage.

* * * * *